May 17, 1966   G. GUANELLA   3,252,072
ARRANGEMENT FOR DIRECT CURRENT TAPPING WITH CONSTANT VOLTAGE
ON A CURRENT CARRYING LINE CONDUCTOR
Filed Oct. 12, 1960   3 Sheets-Sheet 1

INVENTOR.
Gustav Guanella
BY
Pierce, Scheffler & Parker
Attorneys

INVENTOR.
Gustav Guanella
BY
Pierce, Scheffler & Parker
Attorneys

United States Patent Office 3,252,072
Patented May 17, 1966

3,252,072
ARRANGEMENT FOR DIRECT CURRENT TAPPING WITH CONSTANT VOLTAGE ON A CURRENT CARRYING LINE CONDUCTOR
Gustav Guanella, Zurich, Switzerland, assignor to Aktiengesellschaft Brown, Boveri & Cie, Baden, Switzerland, a joint-stock company
Filed Oct. 12, 1960, Ser. No. 62,242
Claims priority, application Switzerland, Oct. 17, 1959, 79,574
7 Claims. (Cl. 321—8)

The present invention relates to apparatus for measuring line currents in electrical transmission systems and more particularly to an improved arrangement for a current transformer and associated rectifier for providing a voltage suitable for modulating a transmitter.

At the present time efforts are made to carry out current measurements on high voltage line conductors by associating with the conductor a small high-frequency transmitter which is modulated in dependence on the current in the conductor. The modulation can be in terms of frequency or it can be in terms of phase, each being variable in accordance with the variation in conductor current.

The current supply necessary for operation of the transmitter can, however, as a practical matter, take place only through a tapping of current from the line conductors themselves. The line voltage is not practical for such use because of its extremely high amplitude.

In the accompanying drawings which form part of the application:

Figure 1:
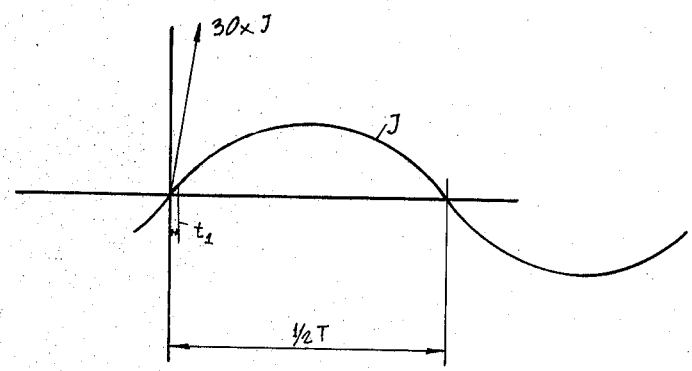
FIG. 1 is a curve showing the alternating current which is to be tapped.
Figure 2:
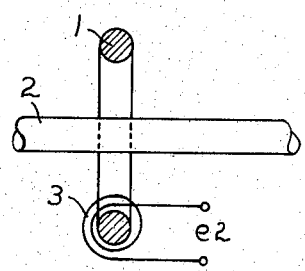
FIG. 2 is a view of a current transformer and secondary circuit for measuring an alternating current.
Figure 3:
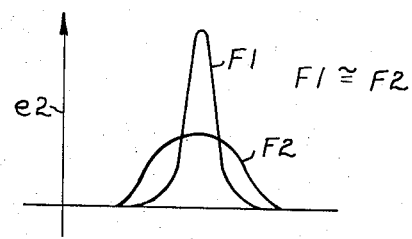
FIG. 3 is a curve showing the voltage produced by the secondary of the transformer of FIG. 2.

Upon switching in the current on the conductor, the transmitter must be able to start the transmission of the line current measurement immediately, for example, already at moment $t_1$, therefore considerably before reaching a maximum current value. The transmission of the measurement by the transmitter should already be under way when the line current has reached $\frac{1}{10}$ of its nominal value, as is shown in FIG. 1. The third condition is that the transmitter device must not be destroyed should the line current, in the event of a short circuit in the line, rise to thirty times its nominal value. Thus, with the invention, it is a matter of being able to tap from the line conductor a voltage which, if possible, is not dependent, or only slightly, on the current in the line conductor. The arrangement, shown in FIG. 2, includes a transformer core 1 in the form of a ring which surrounds the line conductor 2, the ring being made of a material having a high permeability characteristic and whose magnetization curve runs as rectangularly as possible. If such a core is magnetized with a slight or with a strong current, there arises on the secondary winding 3, which is wound on the core, corresponding voltage pulses which have a wave form as shown in FIG. 3. A slight current results in a broad voltage wave form F2 and a rapidly rising strong current results in a more narrow, and considerably steeper, wave form F1. In both cases, the voltage-time areas of the two waves, i.e. the respective areas beneath the curves, are equal. They differ only in their peak amplitude and in their duration.

The invention thus is directed to a device for current tapping with a constant voltage on a current-carrying line conductor. The invention resides in a transformer wherein the line conductor serves as the primary, the transformer including a core of highly permeable magnetizable ferromagnetic material having a rectangular magnetization curve surrounding the line conductor, and there being a secondary winding on the core having an output circuit which includes a rectifier and voltage-smoothing devices consisting of at least one condenser connected in parallel.

Figure 4:
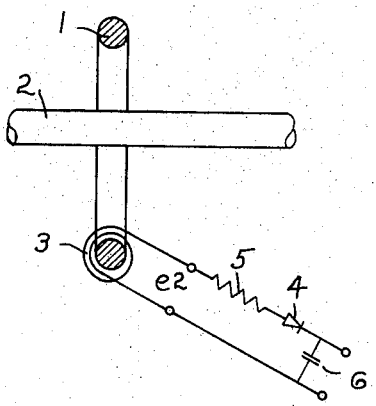
FIG. 4 is a view of a current transformer and associated secondary circuit in accordance with the invention and which includes rectifier and parallelling smoothing condenser.

FIG. 4 illustrates an embodiment of the invention with the basic requirements. With reference now to this view, the line conductor carrying the current to be measured is indicated at 2 and the highly permeable ferromagnetic core surrounding the same is indicated at 1. The magnetization curve of the core runs as rectangularly as possible. Surrounding the core is the transformer secondary winding 3 and this produces a voltage $e2$. A rectifier circuit is connected to the transformer secondary winding 3, this circuit including a rectifier 4 connected in series with a resistance 5 and a condenser 6 connected in parallel with the secondary winding at the output side of the rectifier 4. A voltage can then be taken off condenser 6 which is at least approximately already constant, while the current through the line conductor can vary within broad limits. This current varies in limits between about $\frac{1}{10}$ up to 30 times the nominal value.

Figure 5:
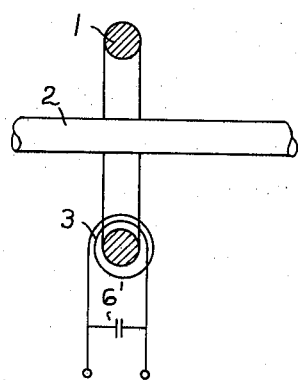
FIG. 5 is a view of a modified embodiment of the invention wherein an additional condenser is connected in parallel with the transformer secondary in advance of the rectifier.

In order to level out the output voltage on condenser 6, additional means can also be used, e.g. another condenser 6' connected in parallel with the secondary winding 3 in advance of the rectifier circuit. Such an arrangement is illustrated in FIG. 5.

Figure 6:
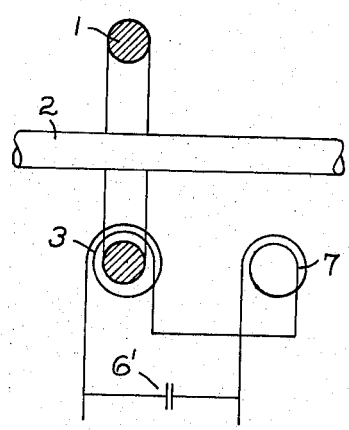
FIG. 6 is a view of a further embodiment of the invention similar to FIG. 5 and which includes a compensating coil connected in series with the transformer secondary.

A further improved result can be obtained by using a compensating coil 7 connected in series with the secondary winding 3. Such an arrangement is illustrated in FIG. 6. By means of the compensating coil 7, a countervoltage is induced which compensates the slight voltage increase practically always still present with large currents and a saturated core.

For the further improvement of the effect, another rectifier can be connected parallel to condenser 6'. This rectifier is so poled that it lets the current through when the first rectifier 4 blocks. Thereby the at times negative voltage half-wave is to be suppressed.

Figure 7:
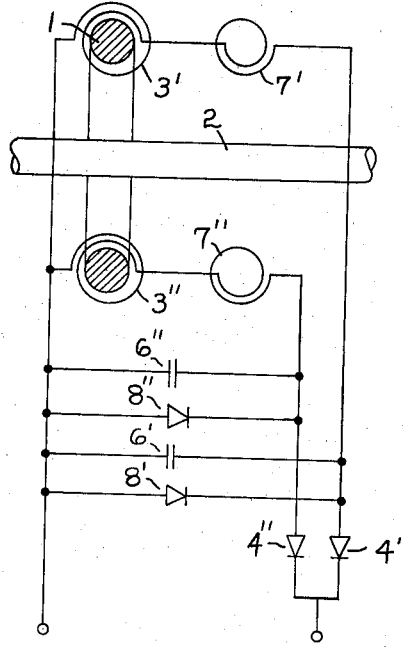
FIG. 7 is a view of another embodiment wherein the improved current transformer and associated secondary connected rectifier circuit operates on both halves of the alternating current wave.

The arrangement shown in FIG. 4 can be utilized only for a half-wave of the current flowing in the line conductor. In order to use both half-waves, a push-pull arrangement can be provided in the manner illustrated in FIG. 7. In this arrangement a series connected secondary winding 3" and compensating coil 7" is provided for one half-wave of the line current, and a similar series connected secondary winding 3' and compensating coil 7' is provided for the other half-wave of the line current. A rectifier 4" is connected to the secondary circuit comprising secondary winding 3″ and compensating coil 7″, and a similar rectifier 4′ is connected to the secondary circuit comprising secondary winding 3′ and compensating coil 7′. A rectifier 8″ and condenser 6″ are each connected in parallel with the secondary circuit constituted by winding 3″ and coil 7″, in advance of rectifier 4″, and a rectifier 8′ and condenser 6′ are each connected in parallel with the secondary circuit constituted by winding 3′ and coil 7′ in advance of rectifier 4′.

Figure 8:
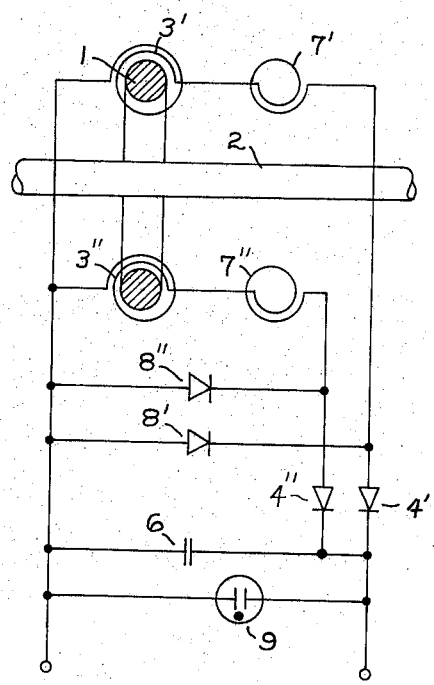
FIG. 8 is a view of a further embodiment similar to FIG. 7 and which includes a voltage-dependent load resistance connected in parallel with the output terminals.

To avoid a possible inadmissible voltage rise at too slight a load, a voltage-dependent load resistance can be connected in parallel with the output terminals. Such an arrangement is illustrated in FIG. 8 which is seen to be similar to that of FIG. 7 in that both half waves of the line conductor current are rectified by rectifiers 4″ and 4′. Rectifiers 8″ and 8′ are connected in parallel with respective secondary circuits as in FIG. 7 and a smoothing condenser 6 is connected in parallel with the rectifier output. The voltage-dependent load resistance connected in parallel with the rectifier output is, in the illustrated embodiment, constituted by a glow tube 9.

Figure 9:
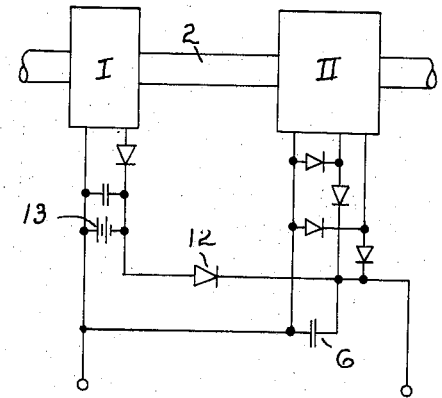
FIG. 9 is a view of still another embodiment utilizing two current transformers connected in parallel.

To provide for operation in a case where there may be brief interruptions in line current, an arrangement according to FIG. 9 can be provided. Here it will be seen that two transformer devices I and II, each similar in construction to the ones previously described, are connected in parallel by means of a rectifier 12. A battery 13 is continually charged across the transformer device I and makes possible a continuous current supply in case of brief interruptions in the line conductor current.

The device makes it possible, in the briefest time, i.e. in less than a half-wave of the current in the line conductor, to supply the auxiliary direct current necessary for operation of the measuring modulation unit.

In the event of an interruption in the line conductor current, the magnetic flux remaining in core 1 as a result of remanence depends upon the direction in which the current flowed immediately before the interruption. In case the current, when turned on again, flows in the same direction, then since no demagnetizing of the core appears immediately, the first voltage impulse does not appear within the first half-wave, but at the earliest only after a lapse of the half-wave. The voltage start is also associated with a delay for at least a half-wave. Only when the current, when turned on again, flows in the opposite direction does a voltage impulse arise practically without delay.

In order to obtain in both cases of switching on again after a current interruption as discussed above, a voltage impulse without delay, i.e. within the first half-wave, there can be inserted in the magnetic core an additional core piece of a permanent magnet. By means of this permanent magnet, a continuous magnetic flux is produced. The direction of this flux remains independent of the direction of the magnetizing flux produced by the line conductor current when turned on again after an interruption. The insertion of this permanent magnet has the same effect as the application of a direct-current permagnetizing winding.

The permanent magnet can be inserted, e.g. into an air gap in the ring-shaped core in the form of a disc.

Figure 10:
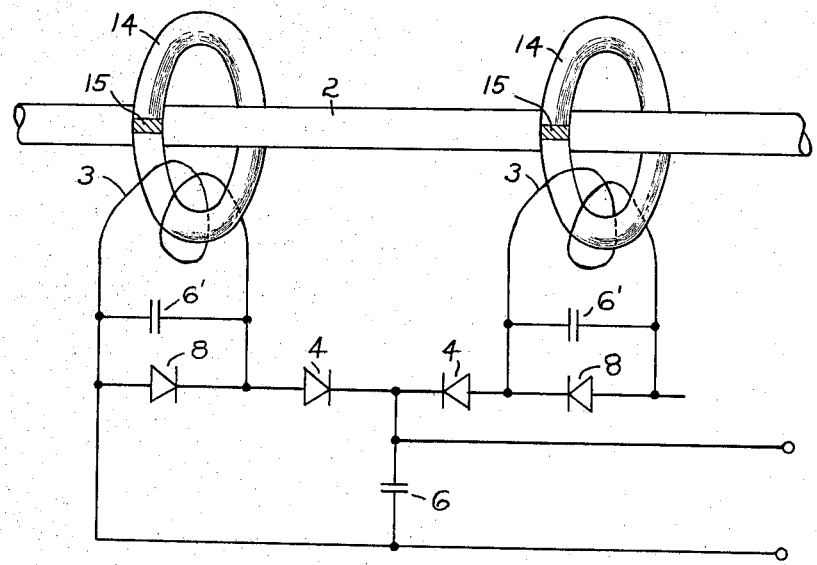
FIG. 10 is a view of an embodiment similar to FIG. 9 using two current transformers connected in parallel.

Use is recommended of two such arrangements as shown in FIG. 10. The two transformer ring-shaped cores are indicated at 14 and each of these is provided with a permanent magnet insert 15. In one of these cores, or the other, a demagnetization takes place immediately when the current is turned back on after an interruption. Correspondingly in the winding on this demagnetized core an induced voltage is immediately produced. On the direct current side of condenser 6 the current supply for the modulation unit sets in practically without delay in any case.

The permanent magnet has such a magnetizing power that the remanent induction is displaced sufficiently away from zero for the two extreme values.

I claim:

1. In an arangement for direct current tapping with constant voltage on an alternating current carrying line conductor, the combination comprising a transformer core of ferromagnetic material having a high permeability and a substantially rectangular magnetization characteristic surrounding said line conductor which constitutes the primary of the transformer, the conductor current strength being so selected in relation to said core that core saturation will have been attained when the conductor current reaches one-tenth of its nominal value, a transformer secondary winding on said core, a rectifier circuit connected to said secondary winding for rectifying the voltage induced in said secondary winding and a condenser connected across said secondary winding in advance of said rectifier circuit, said rectifier producing a direct voltage output substantially independent of said conductor current as soon as said conductor current reaches substantially one-tenth of its nominal value and achieves saturation of said transformer core.

2. An arrangement according to claim 1 and which further includes a second condenser connected across said secondary winding at the output side of said rectifier circuit.

3. An arrangement according to claim 1 and which further includes a compensating coil connected in series with said secondary winding in advance of said condenser.

4. An arrangement according to claim 1 and which further includes another rectifier connected in parallel with said condenser.

5. An arrangement comprising two transformer and rectifier circuits each as defined in claim 1 which are connected in parallel and wherein the core of each transformer includes a permanent magnet insert.

6. An arrangement according to claim 1 and which further includes a supplementary direct voltage source such as a battery connected at the output side of said rectifier circuit to maintain an output voltage in the event of an interruption in said conductor current.

7. An arrangement according to claim 6 and which further includes a separate rectifier for feeding said supplementary direct voltage source.

References Cited by the Examiner

UNITED STATES PATENTS

| | | | |
|---|---|---|---|
| 1,640,554 | 8/1927 | Peters | 336—175 X |
| 1,735,092 | 11/1929 | Rollers | 336—175 X |
| 1,955,317 | 4/1934 | Wentz | 336—175 X |
| 2,032,455 | 3/1936 | Williams | 321—16 |
| 2,269,227 | 1/1942 | Rowell | 324—127 |
| 2,494,206 | 1/1950 | Ross | 336—175 X |
| 2,567,744 | 9/1951 | Stanton | 321—16 X |
| 2,808,566 | 10/1957 | Douma | 324—127 |
| 2,866,158 | 12/1958 | Petzinger | 336—175 X |
| 2,892,167 | 6/1959 | Ritz | 336—175 X |
| 2,908,864 | 10/1959 | Shepard | 323—56 |
| 3,042,849 | 7/1962 | Dortort | 323—89 |

FOREIGN PATENTS

| | | |
|---|---|---|
| 904,199 | 2/1954 | Germany. |
| 1,018,995 | 11/1957 | Germany. |
| 499,239 | 1/1939 | Great Britain. |

OTHER REFERENCES

Current Monitoring Arrangement-IBM Technical Disclosure Bulletin, vol. 1, No. 2, August 1958, pp. 7.

LLOYD McCOLLUM, *Primary Examiner.*

SAMUEL BERNSTEIN, MAX LEVY, *Examiners.*

R. A. ZAPPALA, G. J. BUDOCK, J. J. KISSANE, W. H. BEHA, J. C. SQUILLARO, *Assistant Examiners.*